April 23, 1929.  H. A. DAVOL  1,710,018

FRICTION DEVICE FOR HAND THREADING SHUTTLES

Filed Oct. 27, 1927  2 Sheets-Sheet 1

INVENTOR.
Harry Alton Davol
BY
Gardner W. Pearson
ATTORNEY.

April 23, 1929.　　　　H. A. DAVOL　　　　1,710,018
FRICTION DEVICE FOR HAND THREADING SHUTTLES
Filed Oct. 27, 1927　　　2 Sheets-Sheet 2

INVENTOR.
Harry Alton Davol
BY
Gardner W. Pearson
ATTORNEY.

Patented Apr. 23, 1929.

1,710,018

UNITED STATES PATENT OFFICE.

HARRY ALTON DAVOL, OF METHUEN, MASSACHUSETTS, ASSIGNOR TO U. S. BOBBIN & SHUTTLE CO., OF PROVIDENCE, RHODE ISLAND, A CORPORATION OF RHODE ISLAND.

FRICTION DEVICE FOR HAND-THREADING SHUTTLES.

Application filed October 27, 1927. Serial No. 229,201.

This invention relates to friction devices for shuttles.

This invention is one of the type of devices in which there are friction plates pressed together by a spring, the pressure of which can be adjusted by a screw.

This present device applies to a hand threader in which the threading slot is of wood, and its principal advantages are as follows:

The number of parts is reduced to four and they are so positioned that they can be easily removed and easily adjusted while they are so arranged that the parts are not closely fitting but preferably float whereby the danger of the thread cutting grooves is largely avoided.

My device combines simplicity, ease of adjustment and suitability for certain classes of work.

In the drawings, Fig. 1 is a plan view showing the eye end of a shuttle with my device in place.

Figure 12:
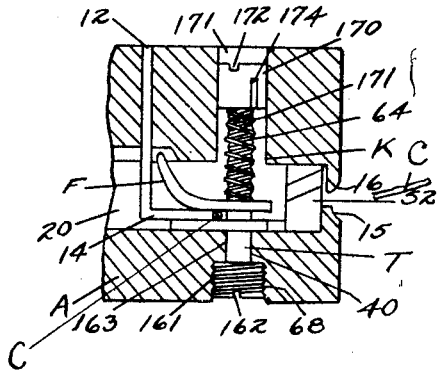
Fig. 12 is a view similar to Fig. 7 showing my preferred type of screw pin.
Figure 13:
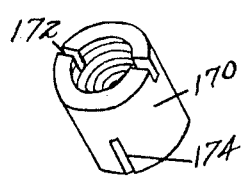

Fig. 13 is a perspective view of the head of a screw pin such as shown in Fig. 12, In the drawings, A represents a shuttle of the ordinary hand threading type having a bobbin chamber 10 in which is the bobbin B from which the thread C unwinds. 11 is a forward extension of the bobbin chamber 10 and from the side of this, preferably, which is opposite the outlet eye, I cut into the wood with a curved saw the vertical passage 12 which extends diagonally or in a curve, this slot extending down at 13 as far as the horizontal slot 14 which is parallel with and at about the middle of the usual thread groove 15. Extending a little up from slot 14, and inward from the bottom of groove 15 is the shuttle eye or thread hole 16.

From the opposite side of the shuttle, with an ordinary round boring tool or reamer I cut the thread delivery passage 20 preferably squaring out the bottom at 17 to receive the flat part of bottom plate D. This delivery passage is at substantially right angles to and connects with the bobbin chamber 10 through slot 9, chamber 11, and it cuts through the slots 12 and 14.

Resting in the bottom 17 of the thread delivery passage 20 is the flat part 49 of an eye plate D such eye plate having a pin hole 50 and at the end next to where the thread is delivered having upstanding guide ears 52 and 53. The front ear 52 is the shorter and is so bent as to leave room for the thread between it and the edge at 120 of delivery passage 20 while the other or longer ear 53 extends at one corner a little above it whereby the thread C can slip through slots 9, 12, 13 and 14, and then up over ear 52 in between it and 53.

Preferably the adjoining edges 54 and 55 of these ears are cut at such an angle that the thread can slip up and over 52 and 54 in between them. Preferably for convenience in turning up these ears, the eye plate D is narrowed in at 51 to form a neck. Up to neck 51 plate D is flat but from that point, it is curved at ears 52 and 53 to fit passage 20.

Figure 7:
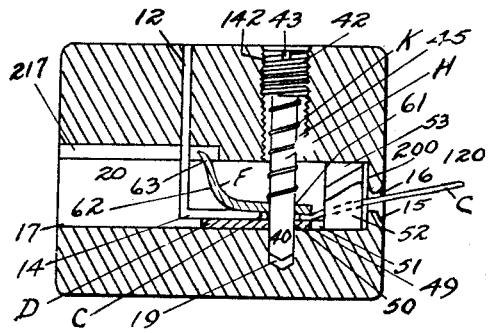
Fig. 7 is a sectional view showing my device with one type of screw pin viewed from the left on the line 7—7 of Fig. 3.

The end 117 of the cut 17 therefore positions plate D so that its end does not reach as far as the end 200 of the round bore 20 whereby as shown in Fig. 7 there is room for the thread C to slip around the end of the ear 52.

Eye plate D has a pin hole 50 through which passes the headed screw pin H which also passes down into the hole 19 in the wood. This headed pin has a shank 40 which extends through hole 45 into this hole, an enlarged threaded head 42 and a slot 43, and is countersunk in the hole 142 in the wood so that it is entirely out of sight but can readily be reached.

K represents a compression spring which encircles shank 40 and presses against head 42, and at its other end against the top friction plate F which rests on eye plate D and has a pin hole 61 through which shank 40 passes, and at its end away from the outlet eye is upturned at 62 to serve as a guide for the thread as it slips down through slot 12 into slots 13 and 14. Preferably tip 63 of end 62 enters a triangular slot 217 in upward extension of delivery passage 20.

This construction makes it almost impossible for the thread C to get in over the top of the upturned tip of F. The position of plate F in slot 217 and the fact that plate F is slightly narrower than the width of passage 20 keeps F from turning.

By bending ear 52 towards the axis of passage 20 or by cutting out at 120 between eye 16 and passage 20, I can get clearance for thread C to slip into position.

Figure 9:
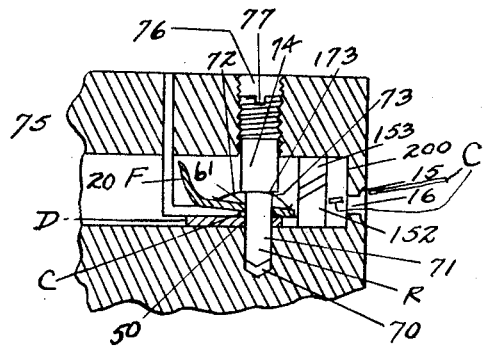
Fig. 9 is a view similar to Fig. 7 of a modification.

The spring 72 in Fig. 9 is of the flat bow type preferably almost as wide as the diameter of delivery passage 20, and rests at each end on plate F which through its middle has a pin hole 73 which bears against a shoulder 173 at the bottom end of the head part 74 of screw pin R, which also has a smooth shank 71 which may be case hardened and extends down through the pin holes 61 and 50 in plates F and D into the hole 70 in the wood. This pin R is countersunk in a hole 76 and head 74 is threaded at 75 and has a turning slot 77.

In this view, I show a considerable space between the ears 152, 153 of plate D and the end 200 of passage 20. In any case this distance can be regulated by the position of the pin holes such as 61 and 50 through the eye plate and friction plate as the pin such as R or H passing through these holes will hold the plates in the desired position.

Figures 1, 2:
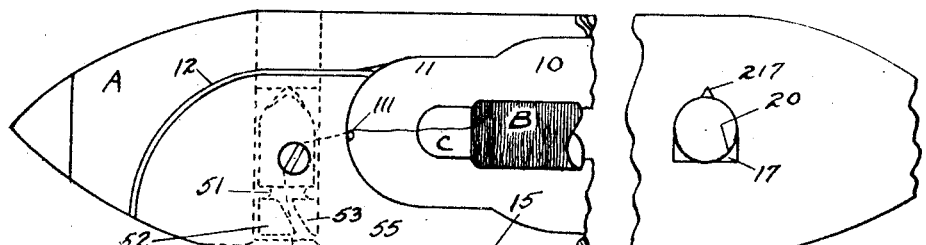
Fig. 2 is an elevation from the side opposite the shuttle eye, which is the side through which the thread passes, of a shuttle before my friction device is put in place.
Figures 3, 4:
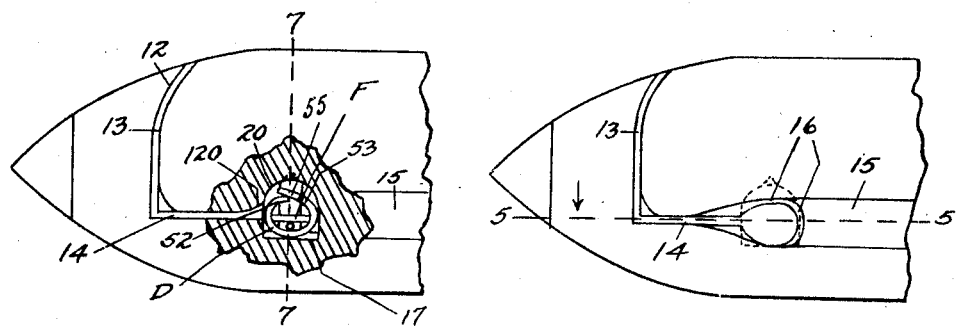
Fig. 3 is an elevation of the eye side of a shuttle with part of the wood broken away to show the interior.
Fig. 4 is a view similar to Fig. 3 of the opposite side from that shown in Fig. 2, before the friction device is put in place.
Figures 5, 6:
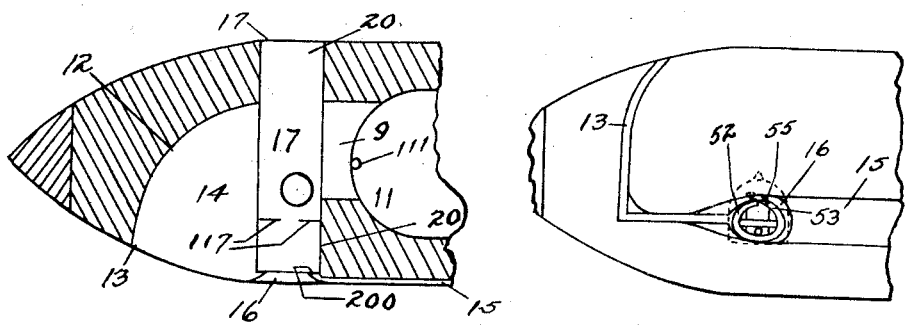
Fig. 5 is a sectional view looking down on the line 5—5 of Fig. 4.
Fig. 6 is an elevation similar to Fig. 3 but with no part of the wood broken away.
Figure 8:
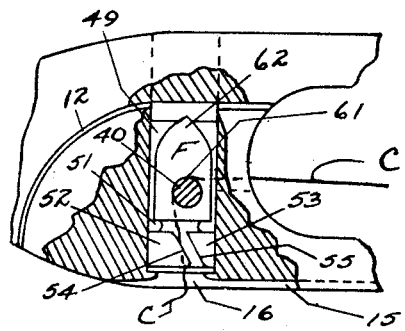
Fig. 8 is a view looking down on a shuttle equipped with my device, with part of the wood broken away.

As shown in Fig. 1, I may drive the pin 111 down into the wood at the front end of chamber 11 at a point directly in line with the axis of the bobbin B so that the thread C in unwinding will do so more smoothly or I may omit this in which case the thread as shown in Fig. 8, will go directly around the shank 40 of screw pin H which therefore serves the double purpose.

Figure 10:
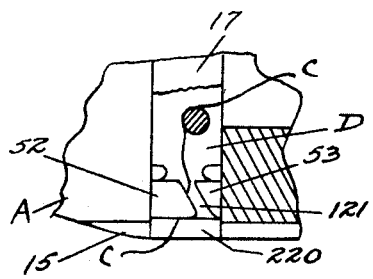
Fig. 10 is a sectional view similar to Fig. 5 but with my device in position in a hole of a somewhat different type.
Figure 11:
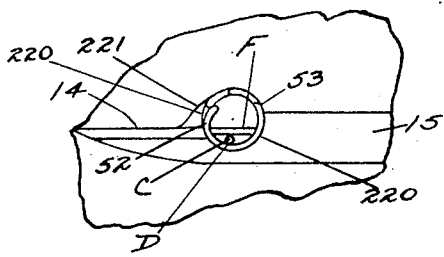
Fig. 11 is a view similar to Fig. 6 showing the type of hole such as is also shown in Fig. 10.

In Figs. 10 and 11 I show a cylindrical delivery passage 220 which extends entirely through the shuttle A so that as shown in Fig. 11 its end becomes the shuttle eye where it joins thread groove 15.

Preferably it is cut away at 221 to allow a clearance for the thread over ear 52. In Figs. 12 and 13 I show what I will still call a screw pin but what is perhaps more properly a screw bolt indicated by T.

The plates F and D are the same as are also the cuts 12 and 14, and slot 15 together with the passage 20, and I show the eye at 16 cut away up to a point a little above ear 52.

In Figs. 12 and 13 I show my preferred type of screw pin for use with my top and bottom plates.

The screw pin T comprises a pin part 40 and as shown has a threaded foot 161 with slot 162 which is screwed into a hole 68 at the bottom of the shuttle A and has smooth shank 40 which extends through hole 163 and up through both plates F and D, being then threaded at 64 to receive the head 170 in the form of a check nut which has a turning slot 172 and pinching slot 174, and which is of a size to slide through the bore 171. Between head 170 and top plate F is the spring K and as foot 161 is fixed in position, I can change the pressure of spring K by turning head 170 in or out on screw part 64 of screw pin T.

To prevent it from turning with head 170, foot 161 may be stuck or glued into position.

I claim:

1. The combination with a shuttle having a bobbin chamber and in forward extension thereof a threading slot one portion of which extends vertically forward and outwardly in a curve and the other portion of which extends horizontally through the side of the shuttle and ends in a thread delivery passage at substantially right angles to and connecting with the bobbin chamber; of an eye plate at the bottom of the thread delivery passage, said eye plate having a pin hole and terminating at its outer end in upstanding guide ears forming a delivery eye of which the forward ear has an upper inner edge which slopes up and out and leaves a clearance for the passage of the thread between it and the wood; a top friction plate having a pin hole and an upturned inner end, said plate resting on the eye plate in the delivery passage; a headed screw pin which passes vertically into the shuttle through said pin holes and serves as a thread deflector from the bobbin chamber to the thread delivery passage; and a compression spring between the top plate and the head of the screw pin.

2. The combination with a shuttle having a bobbin chamber and a threading slot in extension thereof which ends in a thread delivery passage at substantially right angles to and connecting with the bobbin chamber; of an eye plate at the bottom of the thread delivery passage, said eye plate having a pin hole and terminating at its outer end in upstanding guide ears forming a delivery eye the front ear leaving a clearance for the passage of the thread between it and the wood; a top friction plate having a pin hole and an upturned inner end, said plate resting on the eye plate in the delivery passage; a headed screw pin which passes vertically into the shuttle and through said pin holes; and a compression spring between the top plate and the head of the screw pin.

3. The combination with a shuttle having a bobbin chamber and a threading slot in extension thereof which ends in a thread delivery passage at substantially right angles to and connecting with the bobbin chamber; of an eye plate at the bottom of the thread delivery passage, said eye plate having a pin hole and terminating at its outer end in upstanding guide ears; a top friction plate having a pin hole and an upturned inner end, said plate resting on the eye plate in the delivery passage; a headed screw pin which passes vertically into the shuttle and through said pin holes; and a compression spring between the top plate and the head of the screw pin.

HARRY ALTON DAVOL.